(12) United States Patent
Stanhope et al.

(10) Patent No.: US 11,229,156 B2
(45) Date of Patent: Jan. 25, 2022

(54) SYSTEM AND METHOD FOR DETECTING PLUGGING OF AN AGRICULTURAL IMPLEMENT BASED ON TOOL SCRAPER LOADING

(71) Applicant: CNH Industrial America LLC, New Holland, PA (US)

(72) Inventors: Trevor Stanhope, Palos Hills, IL (US); James W. Henry, Saskatoon (CA)

(73) Assignee: CNH Industrial America LLC, New Holland, PA (US)

( * ) Notice: Subject to any disclaimer, the term of this patent is extended or adjusted under 35 U.S.C. 154(b) by 277 days.

(21) Appl. No.: 16/656,712

(22) Filed: Oct. 18, 2019

(65) Prior Publication Data

US 2021/0112699 A1  Apr. 22, 2021

(51) Int. Cl.
*A01C 5/06* (2006.01)
*A01C 7/20* (2006.01)
*A01B 15/16* (2006.01)
*A01B 63/32* (2006.01)
(Continued)

(52) U.S. Cl.
CPC ............. *A01C 5/064* (2013.01); *A01B 15/16* (2013.01); *A01C 7/006* (2013.01); *A01C 7/08* (2013.01); *A01C 7/203* (2013.01); *A01C 7/205* (2013.01); *A01B 63/32* (2013.01)

(58) Field of Classification Search
CPC ......... A01C 5/064; A01C 7/203; A01C 7/205; A01B 15/16; A01B 63/24; A01B 63/32
See application file for complete search history.

(56) References Cited

U.S. PATENT DOCUMENTS

| 5,819,512 A * | 10/1998 | Steffen | A01D 46/085 |
| | | | 56/10.2 R |
| 6,223,832 B1 * | 5/2001 | Hook | A01B 15/16 |
| | | | 172/565 |
| 6,431,981 B1 | 8/2002 | Skinners | |

(Continued)

FOREIGN PATENT DOCUMENTS

CA    2784210 C    4/2017

OTHER PUBLICATIONS

Leeann Minogue, "Case IH's Early Riser Planter," Grainews, Dated Feb. 13, 2015 (3 pages) https://www.grainews.ca/2015/02/13/case-ihs-early-riser-planter-2/.

*Primary Examiner* — Thomas B Will
*Assistant Examiner* — Ian A Normile
(74) *Attorney, Agent, or Firm* — Rebecca L. Henkel; Rickard K. DeMille (57) ABSTRACT

A system for detecting plugging of an agricultural implement includes a frame member and a ground-engaging tool rotatably coupled to the frame member. The ground-engaging tool is configured to engage soil within a field as the agricultural implement is moved across the field. The system also includes a tool scraper positioned relative to the ground-engaging tool such that the tool scraper is configured to remove field materials from the tool as the tool engages the soil. Moreover, the system includes a sensor configured to detect a parameter indicative of a load on the tool scraper and a controller communicatively coupled to the sensor. The controller is configured to monitory the load on the tool scraper based on data received from the sensor and determine when the tool is experiencing a plugged condition based at least in part on the monitored load.

20 Claims, 5 Drawing Sheets

(51) Int. Cl.
*A01C 7/00* (2006.01)
*A01C 7/08* (2006.01)

(56) References Cited

U.S. PATENT DOCUMENTS

| | | |
|---|---|---|
| 6,701,857 B1 | 3/2004 | Jensen |
| 7,648,413 B2 | 1/2010 | Duquesne |
| 7,814,847 B2 | 10/2010 | Schilling |
| 9,405,039 B2 * | 8/2016 | Anderson ............. A01B 79/00 |
| 9,485,900 B2 | 11/2016 | Connell |
| 9,968,030 B2 | 5/2018 | Kowalchuk |
| 10,251,333 B2 | 4/2019 | Bassett |
| 2007/0265041 A1 | 11/2007 | Smith |
| 2012/0291680 A1 * | 11/2012 | Rylander ............... A01C 7/006 |
| | | 111/139 |
| 2017/0094889 A1 * | 4/2017 | Garner ................... A01C 7/201 |
| 2018/0054953 A1 | 3/2018 | Martin |
| 2019/0239413 A1 * | 8/2019 | DeGarmo ............. A01B 21/08 |
| 2020/0120854 A1 * | 4/2020 | Shearer ................. A01B 63/32 |
| 2020/0344939 A1 * | 11/2020 | Sporrer ............... A01B 79/005 |

* cited by examiner

SYSTEM AND METHOD FOR DETECTING PLUGGING OF AN AGRICULTURAL IMPLEMENT BASED ON TOOL SCRAPER LOADING

FIELD OF THE INVENTION

The present disclosure generally relates to systems and method for detecting plugging of an agricultural implement and, more particularly, to systems and methods for detecting plugging of one or more rotating ground-engaging tools of an agricultural implement based on the detection of loads applied through or otherwise exerted on an associated tool scraper(s) of the implement.

BACKGROUND OF THE INVENTION

Modern farming practices strive to increase yields of agricultural fields. In this respect, seed-planting implements are towed behind a tractor or other work vehicle to disperse seed throughout a field. For example, as a seed-planting implement is moved across the field, one or more furrow-forming tools or disc openers of the implement may form a furrow or trench in the soil. One or more dispensing devices may, in turn, deposit the seeds into the furrow(s). After deposition of the seeds, a furrow-closing assembly may close the furrow in the soil, and a packer wheel may pack the soil on top of the deposited seeds.

As the implement is moved across the field, soil and other field materials may accumulate on the disc opener(s). In this regard, the implement may include a disc scraper associated with each opener. In general, each disc scraper is configured to clean or otherwise remove any field materials that accumulate on the corresponding disc opener. However, in certain instances (e.g., when the soil is wet and/or heavy), the amount of field materials accumulating on the disc opener(s) may be too great for the associated disc scraper(s) to remove. In such instances, the disc opener(s) may become plugged with accumulated materials, thereby causing the rotation of such opener(s) to slow or halt. Plugged disc opener(s) may, in turn, result in poor furrow quality and incorrect seed depth.

Accordingly, an improved system and method for detecting plugging of rotating ground-engaging tools of an agricultural implement based on the loads applied through or otherwise exerted on an associated tool scraper(s), such as a disc scraper(s), of the implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for detecting plugging of an agricultural implement. The system includes a frame member and a ground-engaging tool rotatably coupled to the frame member. The ground-engaging tool is configured to engage soil within a field as an agricultural implement is moved across the field. The system also includes a tool scraper positioned relative to the ground-engaging tool such that the tool scraper is configured to remove field materials from the ground-engaging tool as the ground-engaging tool engages the soil. Moreover, the system includes a sensor configured to detect a parameter indicative of a load on the tool scraper and a controller communicatively coupled to the sensor. The controller is configured to monitor the load on the tool scraper based on data received from the sensor and determine when the ground-engaging tool is experiencing a plugged condition based at least in part on the monitored load.

In another aspect, the present subject matter is directed to an agricultural implement including a frame and a plurality of rotating discs supported relative to the frame, with the plurality of rotating discs including a first disc. The implement also includes a disc scraper positioned relative to the first disc such that the disc scraper is configured to remove field materials from the first disc and a sensor configured to detect a parameter indicative of a load on the disc scraper. In addition, the implement includes a controller communicatively coupled to the sensor, with the controller being configured to monitor the load on the disc scraper based on data received from the sensor. Moreover the controller is configured to determine when the first disc is experiencing a plugged condition based at least in part on the monitored load.

In a further aspect, the present subject matter is directed to a method for detecting plugging of an agricultural implement. The agricultural implement may include a ground-engaging tool configured to engage soil within a field as the agricultural implement is moved across the field. The agricultural implement may further include a tool scraper configured to remove the field materials from the ground-engaging tool as the ground-engaging tool engages the soil. The method generally includes monitoring, with a computing device, a load on the tool scraper relative as the agricultural implement is moved across the field. Furthermore, the method includes determining, with the computing device, when the ground-engaging tool is experiencing plugged condition based on the monitored load and initiating, with the computing device, a control action associated with de-plugging the disc when it is determined that the disc is experiencing the plugged condition.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for detecting plugging of an agricultural implement. Specifically, in several embodiments, the system may include one or more sensors configured to capture data indicative of the loads applied through or otherwise exerted on one or more respective tool scrapers of the agricultural implement, with each tool scraper being provided in operative association with a corresponding rotating ground-engaging tool of the agricultural implement. In such embodiments, the load data provided by the sensor(s) may be used to estimate or infer plugging or a plugged condition of the ground engaging tool(s).

For instance, in several embodiments, the disclosed system and method may be utilized in associated with disc scrapers of a seed-planting implement, such as a planter, a disc drill, and/or the like. For instance, each disc scraper may be configured to remove soil, residue, and/or other field materials (collectively referred to herein as "field materials") accumulating on a rotating disc of the seed-planting implement, with the disc generally being configured to rotate relative to soil within a field as the implement is moved across the field. During normal operation of the implement (e.g., when the disc is not plugged with field materials), the disc scraper may be subjected to loading within a normal or expected loading range (e.g., loads between a minimum and maximum operating range) as it functions to scrape-off or otherwise remove field materials accumulating on the associated disc. However, in certain instances (e.g., when the soil is wet and/or heavy), the amount of soil and other field materials accumulating on the disc may be too great for the disc scraper to remove. In such instances, as the disc becomes plugged with field materials, the loads exerted on the disc scraper will generally spike or otherwise increase above the normal or expected loading range, such as to a level above a predetermined maximum non-plugged load threshold. Moreover, as the disc becomes fully plugged and eventually stops rotating, the loads exerted on the disc scraper will generally drop significantly, such as below a predetermined minimum non-plugged load threshold. To detect such load variations, a load sensor(s) may be provided in operative associated with one, some, or all of the disc scrapers provided on an agricultural implement. In this regard, as the agricultural implement is moved across the field, a controller of the disclosed system may be configured to monitor the data received from each load sensor(s) to identify when the load(s) exerted on a given disc scraper exceeds or falls below an associated loading threshold(s), thereby providing an indication that the corresponding disc is experiencing a plugged condition (e.g., a partially or fully plugged condition). Thereafter, upon determining that the disc is experiencing a plugged condition, the controller may be configured to initiate one or more control actions associated with de-plugging the disc. For instance, the control action(s) may include adjusting one or more operating parameters of the agricultural implement, such as the ground speed of the implement, the down pressure applied to disc, and/or the penetration depth of the disc, and/or notifying the operator of the plugged condition of the disc.

It should be appreciated that, for purposes of discussion, the present subject matter will generally be described with reference to estimating or inferring the occurrence of plugged conditions for a seed planting implement by monitoring the loading on disc scrapers provided in operative association with opener discs of the implement. However, in other embodiments, the disclosed system and method may be used to estimate or infer tool plugging by monitoring the loading on tool scrapers provided in operative association with any other rotating ground-engaging tools of a seed planting implement, such as the closer discs, residue managers, press wheels, and/or any other suitable rotating ground-engaging tools of a seed planting implement.

It should also be appreciated that application of the present subject matter need not be limited to seed planting implements. For instance, in alternative embodiments, the disclosed system and method may be used to estimate or infer tool plugging by monitoring the loading on tool scrapers provided in operative association with rotating ground-engaging tools of any other suitable agricultural implement, such as a tillage implement. For instance, aspects of the present subject matter may be used to monitor the loading on disc scrapers provided in operative associated with disc blades and other rotating discs provided on a tillage implement to estimate or infer when such discs are experiencing a plugged condition. An example of a disc scraper for a tillage implement with which the present subject matter may be utilized is disclosed in U.S. Pat. No. 7,290,620 (Cooper et al), entitled "Disk Blade Scrapers for Tillage Apparatus," the disclosure of which is hereby incorporated by reference herein in its entirety for all purposes.

Figure 1:
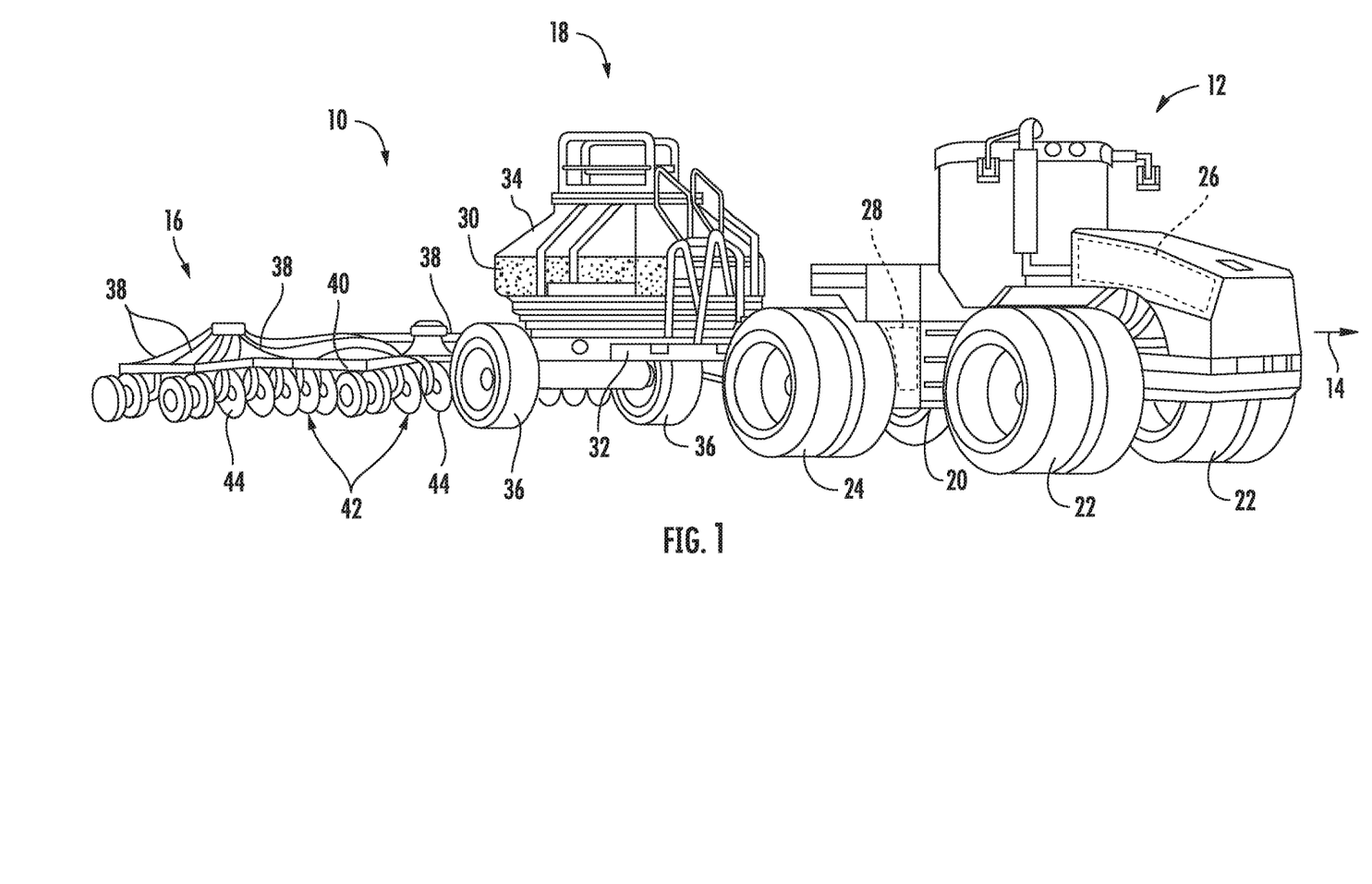
FIG. 1 illustrates a perspective view of one embodiment of an agricultural implement coupled to a work vehicle in accordance with aspects of the present subject matter.

Referring now to the drawings, FIG. 1 illustrates a perspective view of one embodiment of an agricultural implement 10 coupled to a work vehicle 12. In general, the vehicle 12 may be configured to tow the implement 10 across a field in a direction of travel (e.g., as indicated by arrow 14 in FIG. 1). As shown in the illustrated embodiment, the implement 10 is configured as a seed planting implement, specifically a seeder 16 (e.g., a seed disc drill) and an associated air cart 18, and the vehicle 12 is configured as an agricultural tractor. However, in alternative embodiments, the implement 10 may be configured as any other suitable type of implement, such as a planter or another seed-dispensing implement, a side dresser or another fertilizer-dispensing implement, a strip tiller, a tillage implement (e.g., a disc harrow), and/or the like. Similarly, the vehicle 12 may be configured as any other suitable type of vehicle, such as an agricultural harvester, a self-propelled sprayer, and/or the like.

As shown, the vehicle 12 may include a frame or chassis 20 configured to support or couple to a plurality of components. For example, a pair of steerable front wheels 22 and a pair of driven rear wheels 24 (one is shown) may be coupled to the frame 20. The wheels 22, 24 may be configured to support the vehicle 12 relative to the ground and move the vehicle 12 in the direction of travel 14 across the field. However, in alternative embodiments, the front wheels 22 may be driven in addition to or in lieu of the rear wheels 24. Moreover, in further embodiments, the vehicle 12 may include track assemblies (not shown) in place of the front and/or rear wheels 22, 24.

Furthermore, the vehicle 12 may include one or more devices for adjusting the speed at which the vehicle 12 moves across the field in the direction of travel 14. Specifically, in several embodiments, the work vehicle 12 may include an engine 26 and a transmission 28 mounted on the frame 20. In general, the engine 26 may be configured to generate power by combusting or otherwise burning a mixture of air and fuel. The transmission 28 may, in turn, be operably coupled to the engine 26 and may provide variably adjusted gear ratios for transferring the power generated by the engine 26 to the driven wheels 24. For example, increasing the power output by the engine 26 (e.g., by increasing the fuel flow to the engine 26) and/or shifting the transmission 28 into a higher gear may increase the speed at which the vehicle 12 moves across the field. Conversely, decreasing the power output by the engine 26 (e.g., by decreasing the fuel flow to the engine 26) and/or shifting the transmission 28 into a lower gear may decrease the speed at which the vehicle 12 moves across the field.

Referring still to FIG. 1, the air cart 18 may be configured to be towed directly behind the work vehicle 12, with the seeder 16 being towed behind the air cart 18. In this regard, a first hitch assembly (not shown) may couple the air cart 18 to the work vehicle 12, and a second hitch assembly (not shown) may couple the seeder 16 to the air cart 18. However, in an alternative embodiment, the seeder 16 may be towed directly behind the work vehicle 12, with the air cart 18 towed behind the seeder 16. In a further embodiment, the air cart 18 and the seeder 16 may be part of a single unit that is towed behind the work vehicle 12, or elements of a self-propelled vehicle configured to distribute agricultural product across a field.

In several embodiments, the air cart 18 may be configured to store a flowable granular or particulate-type agricultural product 30, such as seeds, fertilizer, and/or the like, to be deposited within the soil. Specifically, in one embodiment, the air cart 18 may include a frame 32 configured to support or couple to various components of the air cart 18. For example, as shown, the frame 32 may be configured to support a hopper or storage tank 34 configured for storing the agricultural product 30 to be deposited within the furrow. Furthermore, a plurality of wheels 36 may be coupled to the frame 32 to permit the air cart 18 to be towed across a field by the work vehicle 12. Additionally, a plurality of delivery conduits 38 may be configured to convey the agricultural product 30 from the air cart 18 to the seeder 16 for deposition into the furrow.

Moreover, in several embodiments, the seeder 16 may include a toolbar 40 configured to support or couple to various components of the seeder 16, such as one or more row units 42. As will be described below, each row unit 42 may include one or more disc openers 44 of an associated furrow-opening assembly 58 (FIG. 2), with each disc opener 44 configured to excavate a furrow or trench in soil to facilitate deposition of the flowable granular or particulate-type agricultural product 30. It should be appreciated that the seeder 16 may generally include any number of row units 42 to facilitate delivery of the agricultural product 30 across a given swath of the soil. For instance, in one embodiment, the seeder 16 may include twenty-four row units 42 spaced apart across the width of the seeder 16. In alternative embodiments, however, the seeder 16 may include any other suitable number of row units 42, such as less than twenty-four row units 42 or more than twenty-four row units 42.

Figure 2:
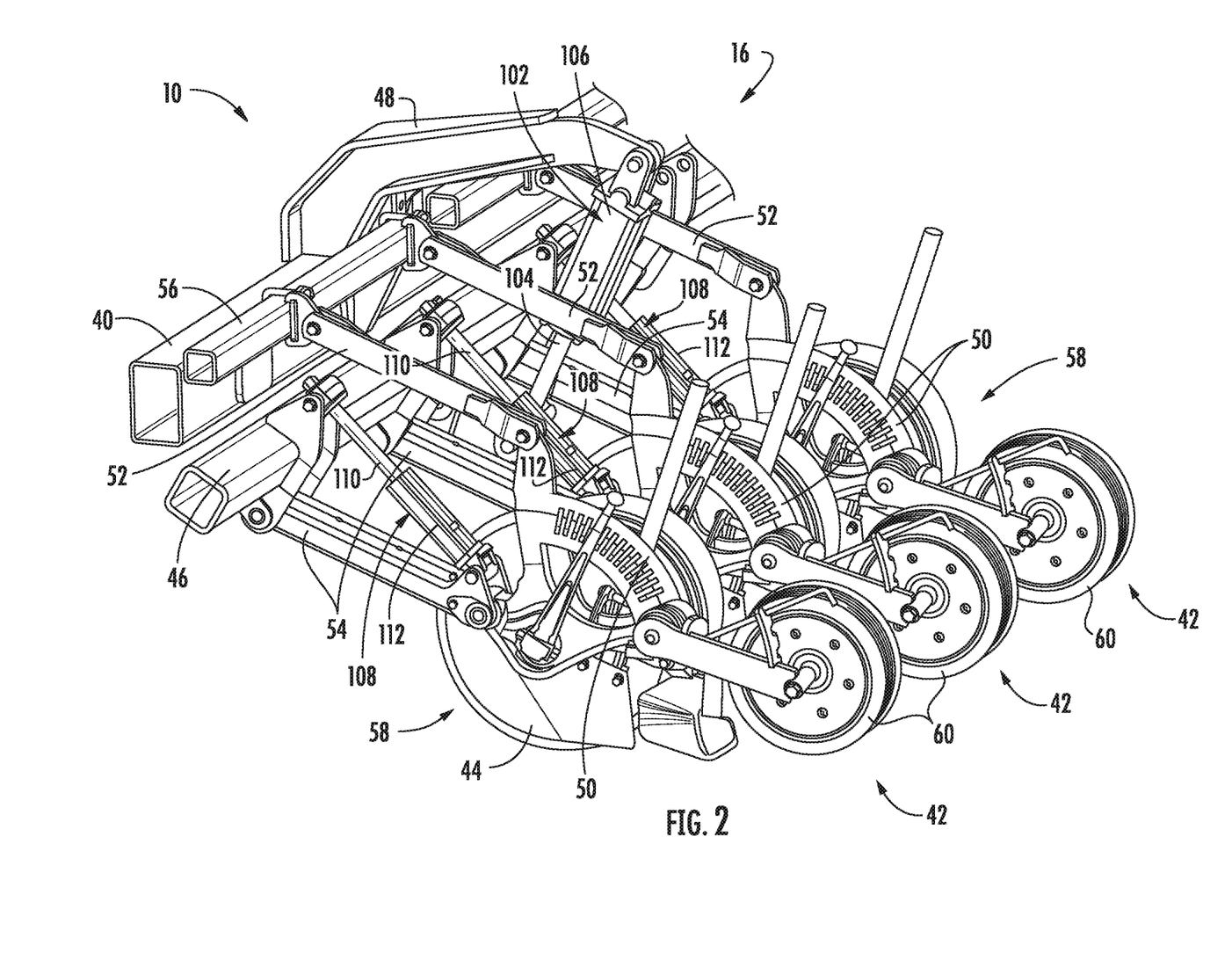
FIG. 2 illustrates an enlarged, partial perspective view of the agricultural implement shown in FIG. 1, particularly illustrating various components of the implement.

Referring now to FIG. 2, an enlarged, partial perspective view of the seeder 16 of the implement 10 shown in FIG. 1 is illustrated. As shown, the seeder 16 may include a rockshaft 46 that is moveable relative to the toolbar 40. In this regard, the seeder 16 may include a rockshaft actuator 102 configured to rotate or otherwise move the rockshaft 46 relative to the toolbar 40. For example, in one embodiment, a first end of the actuator 102 (e.g., a rod 104 of the actuator 102) may be coupled to the rockshaft 46, while a second end of the actuator 102 (e.g., a cylinder 106 of the actuator 102) may be coupled to a support arm 48 of the seeder 16, which is, in turn, coupled to the toolbar 40. As such, the rod 104 of the actuator 102 may be configured to extend and/or retract relative to the cylinder 106 of the actuator 102 to rotate the rockshaft 46 relative to the toolbar 40. Such rotation may, in turn, adjust a down pressure applied to and/or the penetration depth of the disc opener(s) 44 of the various row units 42 ganged together via the rockshaft 46. In the illustrated embodiment, the actuator 102 corresponds to a fluid-driven actuator, such as a hydraulic or pneumatic cylinder. However, in alternative embodiments, the actuator 102 may correspond to any other suitable type of actuator, such as an electric linear actuator.

As indicated above, in several embodiments, a plurality of the row units 42 of the seeder 16 may be ganged together via the toolbar 40 and the rockshaft 46. Each row unit 42 may, in turn, include a frame member or backbone 50 adjustably coupled to the toolbar 40 and the rockshaft 46 by upper and lower links 52, 54. For example, in one embodiment, one end of each upper link 52 may be pivotably coupled to the backbone 50 of the corresponding row unit 42, while an opposed end of each upper link 52 may be pivotably coupled to a rail 56 of the seeder 16, which is, in turn, coupled to the toolbar 40. Similarly, one end of each lower link 54 may be pivotably coupled to the backbone 50 of the corresponding row unit 42, while an opposed end of each lower link 54 may be pivotably coupled to the rockshaft 46. As such, each pair of links 52, 54 may allow the corresponding row unit 42 to pivot relative to the toolbar 40 and the rockshaft 46. However, in alternative embodiments, each row unit 42 may be coupled to the toolbar 40 and/or the rockshaft 46 in any other suitable manner.

Additionally, the seeder 16 may include a plurality of row unit actuators 108. Each actuator 108 may, in turn, be configured to move or otherwise adjust the position one of the row units 42 relative to the rockshaft 46. For example, as shown, in one embodiment, a first end of each actuator 108 (e.g., a rod 110 of the actuator 108) may be coupled to the rockshaft 46, while a second end of the actuator 108 (e.g., a cylinder 112 of the actuator 108) may be coupled to the backbone 50 of the corresponding row unit 42. As such, the rod 110 of each actuator 108 may be configured to extend and/or retract relative to the cylinder 112 of corresponding actuator 108 to move the corresponding row unit 42 relative to the rockshaft 46. Such movement may, in turn, adjust the down pressure applied to and/or the penetration depth of the disc opener(s) 44 of the corresponding row unit 42. In the illustrated embodiment, each actuator 108 corresponds to a fluid-driven actuator, such as a hydraulic or pneumatic cylinder. However, in alternative embodiments, each actuator 108 may correspond to any other suitable type of actuator, such as an electric linear actuator.

Moreover, as shown in FIG. 2, in addition to the disc opener(s) 44 of the furrow-opening assembly 58, each row unit 42 may also include various other components, such as a furrow-closing assembly (not shown), and a press wheel 60. The furrow-closing assemblies are not shown to better illustrate the disc openers 44. As is generally understood, each furrow-closing assembly may include a closing disc(s) configured to close the furrow after seeds have been deposited into the furrow. Each press wheel 60 may, in turn, be configured to roll over the corresponding closed furrow to firm the soil over the seeds and promote favorable seed-to-soil contact.

Figure 3:
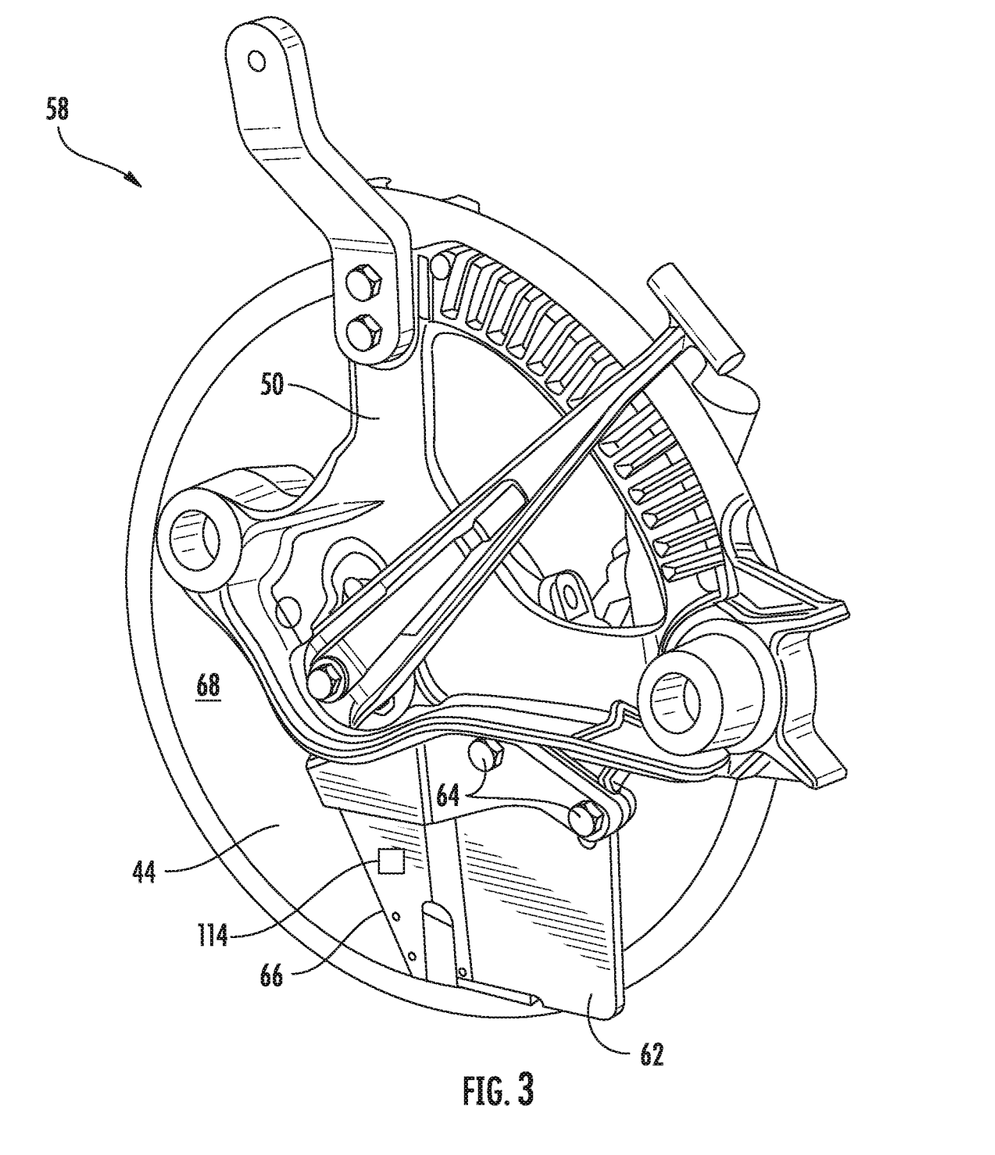
FIG. 3 illustrates a perspective view of one embodiment of a furrow-opening assembly of an agricultural implement in accordance with aspects of the present subject matter, particularly illustrating a disc scraper of the furrow-opening assembly.

Referring now to FIG. 3, a perspective view of one embodiment of a furrow-opening assembly 58 is illustrated in accordance with aspects of the present subject matter. As indicated above, the furrow-opening assembly 58 may include a disc opener 44 configured to excavate a furrow or trench in the soil for the deposition of seeds or other agricultural substances therein. Specifically, in several embodiments, the disc opener 44 may be rotatably coupled to the backbone 50 of the row unit 42. In this regard, as the seeder 16 is moved across the field in the direction of travel 14, the disc opener 44 may be configured to rotate relative to the backbone 50 and the soil within the field such that a furrow is formed. Although the embodiment of the furrow-opening assembly 58 shown in FIG. 3 includes only one disc opener 44, it should be appreciated that the furrow-opening assembly 58 may include any other suitable number of disc openers 44, such as two or more disc openers 44.

In several embodiments, the furrow-opening assembly 58 may include a disc scraper 62 provided in association with the disc opener 44. During a seed-planting operation, soil and other field materials (e.g., crop residue) may adhere to or otherwise accumulate on the disc opener 44 as the opener 44 rotates relative to the soil, particularly when the soil is wet. As such, the disc scraper 62 may be configured to clean or otherwise remove the field materials that have accumulated on the disc opener 44. For example, as shown, in one embodiment, the disc scraper 62 may be configured as a plate-like member that is coupled to the backbone 50 (e.g., via mechanical fasteners 64). Furthermore, in such an embodiment, the disc scraper 62 may be oriented relative to the disc opener 44 such that a leading edge 66 of the scraper 62 is adjacent to a radially-extending surface 68 of the disc opener 44. In this regard, as the disc opener 44 rotates relative to the backbone 50, the leading edge 66 of the disc scraper 62 contacts the soil and other field materials that have accumulated on the radially-extending surface 68 of the opener 44, thereby removing the accumulated materials from the opener 44. However, in alternative embodiments, the disc scraper 62 may have any other suitable configuration that permits the scraper 62 to clean or otherwise remove field materials accumulated on the associated disc opener 44. Additionally, it should be appreciated that the furrow-opening assembly 58 may include additional disc scrapers 62 when the assembly 58 includes more than one disc opener 44. For example, in one embodiment, a disc scraper 62 may be provided in association with each of the disc openers 44.

In accordance with aspects of the present subject matter, the implement 10 may also include one or more load sensors 114 (e.g., a plurality of load sensors 114), with each load sensor 114 being provided in operative association with a respective disc scraper 62 of the implement 10. Specifically, in several embodiments, each load sensor 114 may be configured to detect a parameter indicative of the load applied through or exerted on the associated disc scraper 62 as the scraper 16 functions to scrape-off or otherwise remove field materials from its corresponding disc opener 44 while the agricultural implement 10 is being traversed across the field. As will be described below, the loading on each disc scraper 62 may, in turn, be indicative of whether the associated disc (e.g., the associated disc opener 44) is experiencing a plugged condition, such as when the disc becomes partially or fully plugged with soil and/or other field materials.

As shown in FIG. 3, in one embodiment, each load sensor 114 may be directly installed or mounted on its associated disc scraper 62, such as at a location adjacent to the leading edge 66 of the disc scraper 62. However, in alternative embodiments, the load sensor 114 may be installed at any other suitable location on the implement 10 that allows the sensor to monitor (e.g., directly or indirectly) the load applied through or otherwise exerted on the associated disc scraper 62. Furthermore, it should be appreciated that each load sensor 114 may be configured as any suitable type of sensing device(s) configured to detect the loads applied through or otherwise exerted on the associated disc scraper 62. For instance, in one embodiment, each load sensor 114 may comprise a strain gauge, load cell, and/or the like.

It should be appreciated that the configuration of the agricultural implement 10 and the work vehicle 12 described above and shown in FIGS. 1-3 is provided only to place the present subject matter in an exemplary field of use. Thus, it should be appreciated that the present subject matter may be readily adaptable to any manner of implement and/or vehicle configuration. For instance, in other embodiments, the row units 42 may be individually coupled to the toolbar 40 as opposed to being ganged onto the toolbar 40 via the rock-shaft 46.

Figure 4:
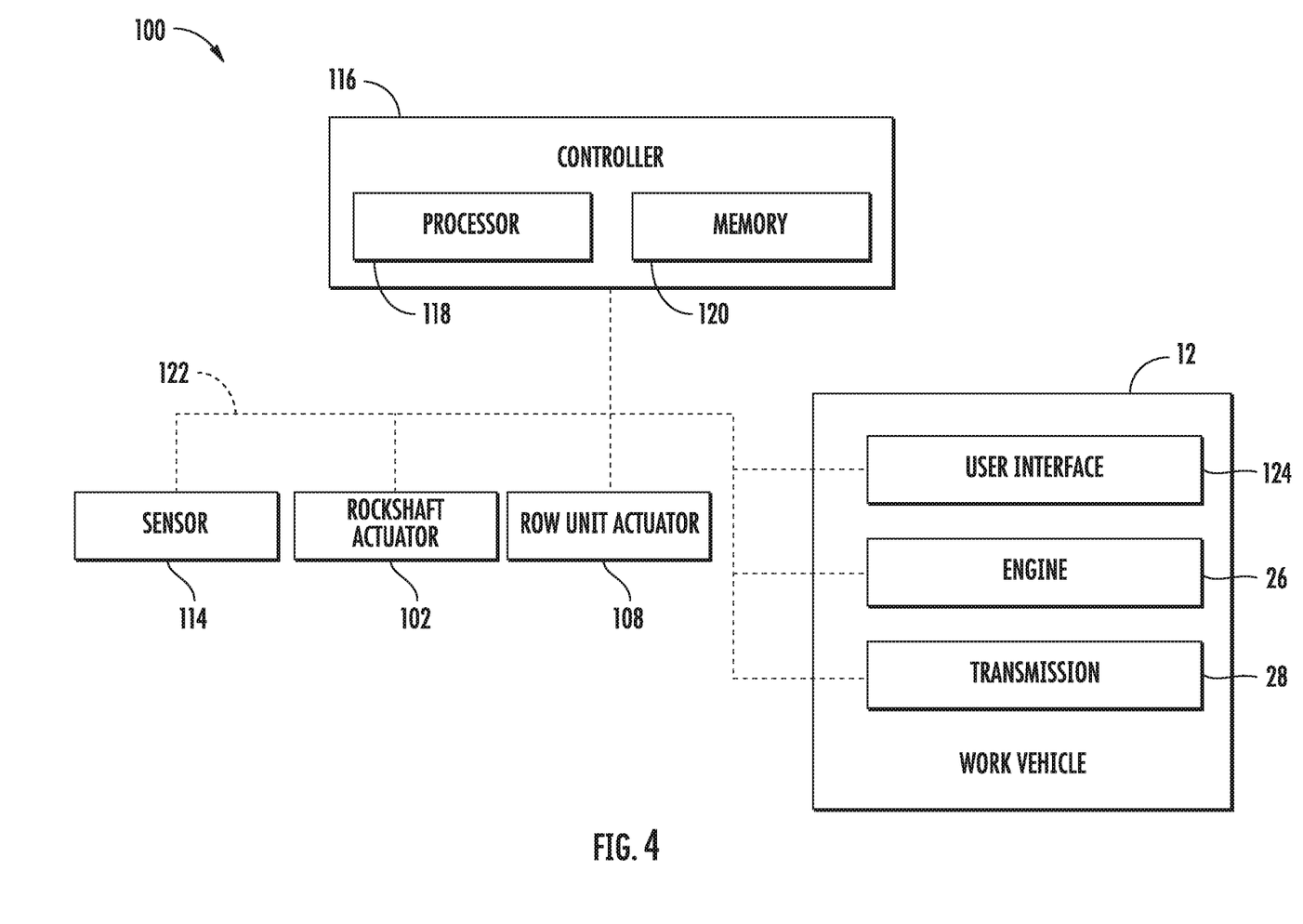
FIG. 4 illustrates a schematic view of one embodiment of a system for detecting plugging of an agricultural implement in accordance with aspects of the present subject matter.

Referring now to FIG. 4, a schematic view of one embodiment of a system 100 for detecting plugging of an agricultural implement is illustrated in accordance with aspects of the present subject matter. In general, the system 100 will be described herein with reference to the agricultural implement 10 and the work vehicle 12 described above with reference to FIGS. 1-3. However, it should be appreciated by those of ordinary skill in the art that the disclosed system 100 may generally be utilized with agricultural implements having any other suitable implement configuration and/or work vehicles having any other suitable vehicle configuration.

As shown in FIG. 4, the system 100 may include a controller 116 positioned on and/or within or otherwise associated with the agricultural implement 10 or the work vehicle 12. In general, the controller 116 may comprise any suitable processor-based device known in the art, such as a computing device or any suitable combination of computing devices. Thus, in several embodiments, the controller 116 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 120 of the controller 116 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 120 may generally be configured to store suitable computer-readable instructions that, when implemented by the processor(s) 118 configure the controller 116 to perform various computer-implemented functions.

In addition, the controller 116 may also include various other suitable components, such as a communications circuit or module, a network interface, one or more input/output channels, a data/control bus and/or the like, to allow controller 116 to be communicatively coupled to any of the various other system components described herein (e.g., the actuators 102, 108, load sensor(s) 114, and/or the like). For instance, as shown in FIG. 4, a communicative link or interface 122 (e.g., a data bus) may be provided between the controller 116 and various system components to allow the controller 116 to communicate with such components via any suitable communications protocol (e.g., CANBUS).

It should be appreciated that the controller 116 may correspond to an existing controller(s) of the agricultural implement 10 and/or the work vehicle 12, itself, or the controller 116 may correspond to a separate processing device. For instance, in one embodiment, the controller 116 may form all or part of a separate plug-in module that may be installed in association with the implement 10 and/or the vehicle 12 to allow for the disclosed system and method to be implemented without requiring additional software to be uploaded onto existing control devices of the implement 10 and/or the vehicle 12. It should also be appreciated that the functions of the controller 116 may be performed by a single processor-based device or may be distributed across any number of processor-based devices, in which instance such devices may be considered to form part of the controller 116. For instance, the functions of the controller 116 may be distributed across multiple application-specific controllers, such as an engine controller, an implement controller, and/or the like.

Furthermore, in one embodiment, the system 100 may also include a user interface 124. More specifically, the user interface 124 may be configured to provide feedback (e.g., feedback or input associated with the loading on the disc scraper(s) 62) to the operator of the implement/vehicle 10/12. As such, the user interface 124 may include one or more feedback devices (not shown), such as display screens, speakers, warning lights, and/or the like, which are configured to provide feedback from the controller 116 to the operator. The user interface 124 may, in turn, be communicatively coupled to the controller 116 via the communicative link 122 to permit the feedback to be transmitted from the controller 116 to the user interface 124. In addition, some embodiments of the user interface 124 may include one or more input devices (not shown), such as touchscreens, keypads, touchpads, knobs, buttons, sliders, switches, mice, microphones, and/or the like, which are configured to receive user inputs from the operator. In one embodiment, the user interface 124 may be mounted or otherwise positioned within a cab of the vehicle 12. However, in alternative embodiments, the user interface 124 may mounted at any other suitable location.

In several embodiments, the controller 116 may be configured to monitor the loads exerted on one or more tool scrapers of an associated agricultural implement. For instance, as described above with reference to the implement configuration shown in FIGS. 1-3, the implement 10 may include one or more disc scrapers 62, with each scraper 62 configured to clean or otherwise remove accumulated soil and other field materials from an associated disc (e.g., the associated disc opener 44). Additionally, in accordance with aspects of the present subject matter, one or more load sensors 114 may be provided in operative association with each disc scraper 62, with each sensor 114 being configured to capture data indicative of the load exerted on its associated disc scraper 62. The load applied through or exerted on each disc scraper 62 may, in turn, be indicative of whether the corresponding disc is experiencing a plugged condition, such as when the disc is partially or fully plugged with field materials. In this regard, as the implement 10 is moved across the field, the controller 116 may receive sensor data from each load sensor(s) 114 (e.g., via the communicative link 122). Thereafter, the controller 116 may be configured to process/analyze the sensor data to determine or estimate the load exerted on each disc scraper 62. For instance, the controller 116 may include a look-up table(s), suitable mathematical formula, and/or algorithms stored within its memory 120 that correlates the received sensor data to corresponding load values for each disc scraper 62. The monitored load values may then be stored within the memory 120 of the controller 116 or transmitted to the user interface 124 (e.g., via the communicative link 122) for display to the operator.

It should be appreciated that the monitored load values may correspond to any suitable parameters associated with the load applied through or otherwise exerted on the associated disc scraper 62. For example, in one embodiment, the monitored load values may correspond to stress or strain values associated with the loading on each disc scraper 62. However, it should be appreciated that, in alternative embodiments, the monitored load values may correspond to any other suitable load-related parameters.

In accordance with aspects of the present subject matter, the controller 116 may be configured to determine when one or more of the rotating ground-engaging tools of an agricultural implement (e.g., the discs of the implement 10 described above) are experiencing a plugged condition based on the corresponding monitored load values. More specifically, as described above, in one embodiment, the disc(s) of the implement 10 (e.g., the disc opener(s) 44) may generally be configured to rotate relative to the soil as the implement 10 is moved across the field, thereby forming a furrow for the deposition of seeds. The relative rotational movement between the disc(s) and the soil may cause soil and/or other field materials to become adhered to the disc(s). In this regard, the associated disc scraper 62 may be configured to clean or otherwise remove the adhered field materials from the disc(s) to prevent the adhered materials from "plugging" the disc(s). In general, the disc(s) may experience a plugged condition when a sufficient amount of field materials has accumulated such that disc(s) is not able to rotate freely relative to its corresponding support member (e.g., the corresponding backbone 50). In such instances, the rotational speed(s) of the disc(s) may slow or even halt depending on the severity of the plugged condition, thereby resulting in poor furrow formation.

In general, when the disc(s) is not plugged, the associated disc scraper(s) 62 may be subjected to loads or loading that fall within an expected or normal load range, such as loads that are greater than a minimum non-plugged load value and less than a maximum non-plugged load value. However, in certain instances (e.g., when the soil is wet and/or heavy), the amount of field materials accumulating on the disc(s) may be too great for the associated disc scraper(s) 62 to remove such that the disc(s) becomes partially or fully plugged with field materials. In such instances, the loading on the disc scraper(s) 62 may initially spike or increase significantly as materials begin to accumulate on the disc(s). Moreover, as disc becomes fully plugged and stops rotating, the loading on the disc scraper(s) 62 may drop significantly As such, the controller 116 may be configured to analyze the monitored load values to determine when the disc(s) of the implement 10 is experiencing a plugged condition.

In several embodiments, the controller 116 may be configured to determine that the disc(s) of the implement 10 is experiencing a plugged condition when the monitored load on the disc scraper(s) falls outside an expected non-plugged loading range for the disc scaper(s) 62. Specifically, the controller 116 may be configured to determine that the disc(s) of the implement 10 is experiencing a plugged condition when the monitored load on the disc scraper(s) either exceeds a predetermined maximum load threshold(s), such as a load threshold(s) selected or based upon the maximum non-plugged load value for the disc scraper(s) 62, or falls below a predetermined minimum load threshold(s), such as a load threshold(s) selected or based upon the minimum non-plugged load value for the disc scraper(s) 62. For instance, in one embodiment, the predetermined maximum load threshold(s) may be set as a load value equal to or greater than the maximum non-plugged load value for the disc scraper(s) 62 and the predetermined minimum load threshold(s) may be set as a load value equal to or greater than the minimum non-plugged load value for the disc scraper(s) 62.

In general, the controller 116 may be configured to compare the values associated with the monitored load(s) of the disc scraper(s) 62 to one or more predetermined load threshold values. For example, in one embodiment, the controller 116 may be configured to compare the monitored load values to first and second predetermined maximum load thresholds, with the first load threshold being less than the second load threshold. In such an embodiment, the plugging of the disc(s) may be of a first or lesser severity when the monitored disc scraper load(s) exceeds the first maximum load threshold, and a second or greater severity when the monitored disc scraper load(s) exceeds the second maximum load threshold. For instance, the first maximum load threshold may be set as a load value equal to or slightly greater than the maximum non-plugged load value and the second maximum load threshold may be set as a load value greater than the first maximum load threshold. Thereafter, when the values for the monitored load exceeds the applicable load threshold(s) (thereby indicating that the disc scraper loads are higher than expected for non-plugged operation), the controller 116 may be configured to estimate or infer that the associated disc(s) is experiencing a plugged condition. It should be appreciated that a similar dual-threshold arrangement may also be used for the minimum load threshold(s) being applied to determine when the disc(s) stops rotating completely.

It should also be appreciated that the predetermined load threshold(s) may vary based on the operation of the implement 10. Specifically, in one embodiment, the predetermined load threshold(s) may vary based on the ground speed of the implement 10. For instance, the normal or expected loading on the disc scraper 62 during non-plugged operation may be higher when the ground speed of the implement 10 is high than when the ground speed of the implement 10 is low. In such an embodiment, the predetermined load threshold(s) may increase when the ground speed of the implement increases. However, in alternative embodiments, the predetermined load threshold(s) may be adjusted based on any other suitable operating parameter(s) of the implement 10.

Furthermore, it should be appreciated that the controller 116 may be configured to determine that the disc(s) of the implement 10 is experiencing a plugged condition using the monitored load(s) of the disc scraper 62 in any other suitable manner. Specifically, in one embodiment, the controller 116 may be configured to compare the load values associated with a plurality of discs. In such an embodiment, when the monitored load(s) of the disc scraper 62 associated with a first disc differs by more than a predetermined amount from the monitored load(s) of the disc scraper 62 associated with a second disc, the controller 116 may be configured to determine that the first disc is experiencing a plugged condition or vice versa. In another embodiment, the controller 116 may be configured to determine a historical average of the monitored load(s) of the disc scraper 62, such as by calculating the average of the load(s) over a predetermined time period (e.g., the last five minutes of operation). Thereafter, when the monitored load(s) of the disc scraper 62 differs by more than a predetermined amount from the historical average, the controller 116 may be configured to estimate or infer that the associated disc is experiencing a plugged condition.

In addition, the controller 116 may be configured to initiate one or more control actions when it is determined that the disc(s) of the implement 10 is experiencing a plugged condition. In general, such control action(s) may be associated with or otherwise intended to prevent further accumulation of field materials on the disc(s) of the implement 10 and/or de-plug or otherwise remove field materials already accumulated on the disc(s). For example, in one embodiment, when it is determined that one or more discs (e.g., the disc opener(s) 44) of the implement 10 are experiencing a plugged condition, the controller 116 may be configured to notify the operator of implement/vehicle 10/12 that the disc(s) is plugged. Specifically, the controller 116 may be configured to transmit instructions to the user interface 124 (e.g., the communicative link 122) instructing the user interface 124 to provide a notification to the operator of the implement/vehicle 10/12 (e.g., by causing a visual or audible notification or indicator to be presented to the operator) indicating that the disc(s) is experiencing a plugged condition. In such instances, the operator may then choose to initiate any suitable corrective action he/she believes is necessary, such as adjusting one or more operating parameters of the implement 10 and/or the vehicle 12.

Moreover, in several embodiments, the controller 116 may be configured to automatically adjust one or more operating parameters of the implement 10 and/or the vehicle 12 when it is determined that one or more discs of the implement 10 are plugged. Specifically, in one embodiment, the controller 116 may be configured to initiate adjustment of the down pressure applied to and/or the penetration depth(s) of one or more discs (e.g., the disc opener(s) 44) of the implement 10. For example, the controller 116 may be configured transmit instructions to the rockshaft actuator 102 and/or the row unit actuator(s) 108 (e.g., via the communicative link 112) instructing the actuator(s) 102, 108 to adjust the down pressure applied to and/or the penetration depth(s) of associated disc opener(s) 44.

Furthermore, in one embodiment, the controller 116 may be configured to automatically adjust the ground speed at which the implement/vehicle 10/12 is traveling across the field when it is determined one or more discs of the implement 10 are experiencing a plugged condition. Specifically, the controller 116 may be configured to transmit instructions to the engine 26 and/or the transmission 28 (e.g., via the communicative link 122) instructing the engine 26 and/or the transmission 28 to adjust their operation. For example, the controller 116 may instruct the engine 26 to vary its power output and/or the transmission 28 to upshift or downshift to increase or decrease the ground speed of the implement/vehicle 10/12 in a manner that reduces or minimizes further accumulation of field materials on the disc(s). However, in alternative embodiments, the controller 116 may be configured to transmit instructions to any other suitable components (e.g., braking actuators) of the vehicle 12 and/or the implement 10 such that the ground speed of the implement/vehicle 10/12 is adjusted. Furthermore, it should be appreciated that any other suitable parameter(s) the implement 10 and/or the vehicle 12 may be adjusted when it is determined one or more discs of the implement 10 are plugged.

Additionally, the controller 116 may be configured to initiate differing control actions based on the severity of the plugging of the disc(s) of the implement 10. As indicated above, in one embodiment, the controller 116 may be configured to compare the monitored load values of the disc scraper(s) 62 to first and second maximum load thresholds. In such an embodiment, the first load threshold may be associated with a first or lesser severity of plugging, while the second load threshold may be associated with a second or greater severity of plugging. In this regard, when the monitored load values of one or more disc scrapers 62 of the implement 10 exceed the first maximum load threshold, the controller 116 may be configured initiate a first control action. Thereafter, when the monitored load values of one or more disc scrapers 62 of the implement 10 exceed the second maximum load threshold, the controller 116 may be configured initiate a second, differing control action. In general, the second control action may be configured to more aggressively prevent further material accumulation on and/or de-plug the disc(s) than the first control action. For example, in one embodiment, the first control action may correspond to adjusting an operating parameter of the implement 10 (e.g., the ground speed and/or the down pressure applied and/or the penetration depths of the disc opener(s) 44), while the second control action comprises halting the operation of the implement 10. However, in alternative embodiments, the first and second control actions may correspond to any other suitable control actions.

Figure 5:
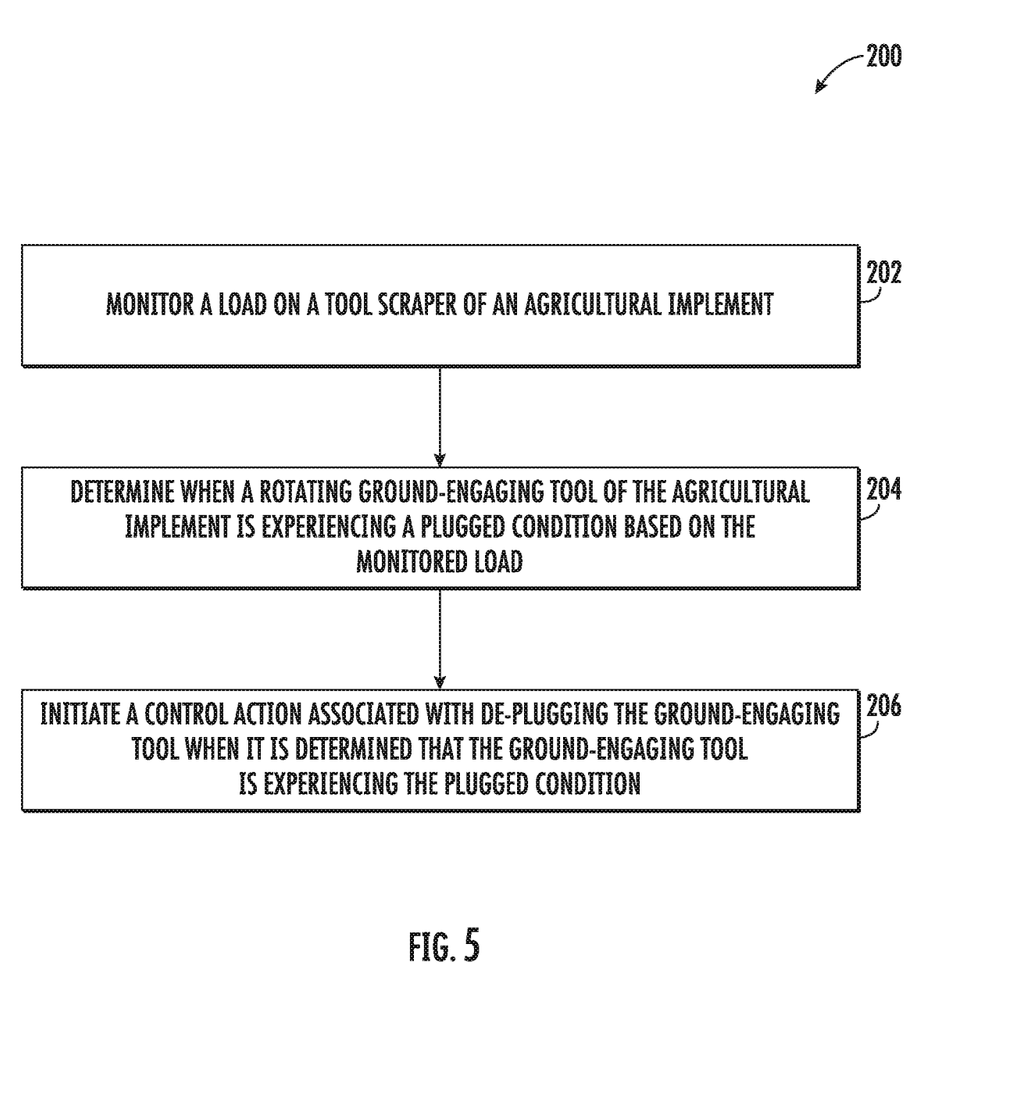
FIG. 5 illustrates a flow diagram of one embodiment of a method for detecting plugging of an agricultural implement in accordance with aspects of the present subject matter Repeat use of reference characters in the present specification and drawings is intended to represent the same or analogous features or elements of the present technology.

Referring now to FIG. 5, a flow diagram of one embodiment of a method 200 for detecting plugging of an agricultural implement is illustrated in accordance with aspects of the present subject matter. In general, the method 200 will be described herein with reference to the agricultural implement 10, the work vehicle 12, and the system 100 described above with reference to FIGS. 1-4. However, it should be appreciated by those of ordinary skill in the art that the disclosed method 200 may generally be implemented with any agricultural implement having any suitable implement configuration, any work vehicle having any suitable vehicle configured, and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring, with a computing device, a load on a tool scraper of an agricultural implement. For instance, as described above, the controller 116 may be configured to monitor the load applied through or otherwise exerted on a disc scraper 62 of an agricultural implement 10 based on data received from an associated load sensor 114.

Additionally, at (204), the method 200 may include determining, with the computing device, when a rotating ground-engaging tool of the agricultural implement is experiencing a plugged condition based on the monitored load. For instance, as described above, the controller 116 may be configured to determine when an opener disc 44 of the implement 10 is experiencing a plugged condition based on the monitored loads associated with its corresponding disc scraper 62, such as by comparing the monitored loads to an applicable load threshold(s).

Moreover, as shown in FIG. 5, at (206), the method 200 may include initiating, with the computing device, a control action associated with de-plugging the ground-engaging tool when it is determined that the ground-engaging tool is experiencing the plugged condition. For instance, as described above, when it is determined that an opener disc 44 is plugged, the controller 116 may be configured to initiate one or more control actions associated with de-plugging the opener disc 44, such as adjusting one or more operating parameters of the implement 10 and/or vehicle 12. Such operating parameters may include the ground speed of the implement/vehicle 10/12 and/or the down pressure applied to and/or the penetration depth(s) of the opener disc 44.

It is to be understood that the steps of the method 200 are performed by the controller 116 upon loading and executing software code or instructions which are tangibly stored on a tangible computer readable medium, such as on a magnetic medium, e.g., a computer hard drive, an optical medium. e.g., an optical disc, solid-state memory, e.g., flash memory, or other storage media known in the art. Thus, any of the functionality performed by the controller 116 described herein, such as the method 200, is implemented in software code or instructions which are tangibly stored on a tangible computer readable medium. The controller 116 loads the software code or instructions via a direct interface with the computer readable medium or via a wired and/or wireless network. Upon loading and executing such software code or instructions by the controller 116, the controller 116 may perform any of the functionality of the controller 116 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for detecting plugging of an agricultural implement, the system comprising:
   a frame member;
   a ground-engaging tool rotatably coupled to the frame member, the ground-engaging tool configured to engage soil within a field as an agricultural implement is moved across the field;
   a tool scraper positioned relative to the ground-engaging tool such that the tool scraper is configured to remove field materials from the ground-engaging tool as the ground-engaging tool engages the soil;
   a sensor configured to detect a parameter indicative of a load on the tool scraper; and
   a controller communicatively coupled to the sensor, the controller configured to monitor the load on the tool scraper based on data received from the sensor, the controller being further configured to determine when the ground-engaging tool is experiencing a plugged condition based at least in part on the monitored load.

2. The system of claim 1, wherein the controller is further configured to:
   compare the monitored load to a predetermined load threshold; and
   determine that the ground-engaging tool is experiencing the plugged condition when the monitored load exceeds or falls below the predetermined load threshold.

3. The system of claim 1, wherein the ground-engaging tool comprises a rotating disc.

4. The system of claim 1, wherein the controller is further configured to initiate a control action associated with de-plugging the ground-engaging tool when it is determined that the ground-engaging tool is experiencing the plugged condition.

5. The system of claim 4, wherein the control action comprises notifying an operator of the agricultural implement that the ground-engaging tool is experiencing the plugged condition.

6. The system of claim 4, wherein the control action comprises adjusting an operating parameter of the agricultural implement.

7. The system of claim 6, wherein the operating parameter comprises a ground speed of the agricultural implement.

8. The system of claim 6, wherein the operating parameter comprises at least one of a down pressure applied to or a penetration depth of the ground-engaging tool.

9. The system of claim 1, wherein the controller is further configured to:
   initiate a first control action when the monitored load exceeds a first predetermined load threshold; and
   initiate a second control action when the monitored load exceeds a second predetermined load threshold, the second predetermined load threshold being greater than the first predetermined load threshold.

10. The system of claim 9, wherein the first control action comprises adjusting an operating parameter of the agricultural implement and the second control action comprises halting the operation of the agricultural implement.

11. An agricultural implement, comprising:
    a frame;
    a plurality of rotating discs supported relative to the frame, the plurality of rotating discs including a first disc;
    a disc scraper positioned relative to the first disc such that the disc scraper is configured to remove field materials from the first disc;
    a sensor configured to detect a parameter indicative of a load on the disc scraper; and
    a controller communicatively coupled to the sensor, the controller configured to monitor the load on the disc scraper based on data received from the sensor, the controller further configured to determine when the first disc is experiencing a plugged condition based at least in part on the monitored load.

12. A method for detecting plugging of an agricultural implement, the agricultural implement including a ground-engaging tool configured to engage soil within a field as the agricultural implement is moved across the field, the agricultural implement further including a tool scraper configured to remove field materials from the ground-engaging tool as the ground-engaging tool engages the soil, the method comprising:
    monitoring, with a computing device, a load on the tool scraper as the agricultural implement is moved across the field;
    determining, with the computing device, when the ground-engaging tool is experiencing a plugged condition based at least in part on the monitored load; and
    initiating, with the computing device, a control action associated with de-plugging the ground-engaging tool when it is determined that the ground-engaging tool is experiencing the plugged condition.

13. The method of claim 12, wherein determining when the ground-engaging tool is experiencing the plugged condition comprises:
    comparing, with the computing device, the monitored load to a predetermined load threshold; and
    determining, with the computing device, that the ground-engaging tool is experiencing the plugged condition when the monitored load exceeds or falls below the predetermined load threshold.

14. The method of claim 12, wherein the control action comprises notifying an operator of the agricultural implement that the ground-engaging tool is experiencing the plugged condition.

15. The method of claim 12, wherein the control action comprises adjusting an operating parameter of the agricultural implement.

16. The method of claim 15, wherein the operating parameter comprises a ground speed of the agricultural implement.

17. The method of claim 15, wherein the operating parameter comprises at least one of a down pressure applied to or a penetration depth of the ground-engaging tool.

18. The method of claim 12, wherein initiating the control action comprises:
    initiating, with the computing device, a first control action when the monitored load exceeds a first predetermined load threshold; and
    initiating, with the computing device, a second control action when the monitored load exceeds a second predetermined load threshold, the second predetermined load threshold being greater than the first predetermined load threshold.

19. The method of claim 18, wherein the first control action comprises adjusting an operating parameter of the agricultural implement and the second control action comprises halting the operation of the agricultural implement.

20. The method of claim 12, wherein the ground engaging tool comprises a rotating disc of the agricultural implement.

* * * * *